(12) United States Patent
Sato

(10) Patent No.: US 9,104,088 B2
(45) Date of Patent: Aug. 11, 2015

(54) LIGHT AMOUNT ADJUSTING APPARATUS, LENS BARREL, AND IMAGING APPARATUS

(71) Applicant: CANON KABUSHIKI KAISHA, Tokyo (JP)

(72) Inventor: Katsuhiko Sato, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/168,728

(22) Filed: Jan. 30, 2014

(65) Prior Publication Data

US 2014/0212123 A1  Jul. 31, 2014

(30) Foreign Application Priority Data

Jan. 30, 2013  (JP) .................................. 2013-016124

(51) Int. Cl.
*G03B 9/06*  (2006.01)

(52) U.S. Cl.
CPC ........................................ *G03B 9/06* (2013.01)

(58) Field of Classification Search
USPC ........................................................... 396/510
See application file for complete search history.

(56) References Cited

U.S. PATENT DOCUMENTS 5,594,519 A * 1/1997 Shimizu ......................... 396/449
5,749,015 A * 5/1998 Sato et al. ..................... 396/508
7,559,709 B2 * 7/2009 Oh ................................. 396/510
2010/0021157 A1 * 1/2010 Kawamoto et al. ........... 396/510
2010/0195182 A1 * 8/2010 Kawamoto .................... 359/234
2012/0057859 A1 * 3/2012 Byon et al. .................... 396/510
2012/0170096 A1 * 7/2012 Kawamoto .................... 359/230

FOREIGN PATENT DOCUMENTS

| JP | 3-31945 Y2 | 7/1991 |
| JP | 2002-131802 A | 5/2002 |
| JP | 2002-148675 A | 5/2002 |
| JP | 2002-156683 A | 5/2002 |
| JP | 2003-121901 A | 4/2003 |
| JP | 2007-163827 A | 6/2007 |
| JP | 2007163827 A * | 6/2007 |

* cited by examiner

Primary Examiner — W B Perkey
Assistant Examiner — Linda B Smith
(74) Attorney, Agent, or Firm — Rossi, Kimms & McDowell LLP

(57) ABSTRACT

Provided is a light amount adjusting apparatus wherein a base member has a plurality of supporting parts for supporting the plurality of light amount adjusting blades and a second contact part is located outside a circle extending through the plurality of supporting parts, wherein a contact part between the second contact part and a first contact part is constituted at the other surface of the base member with respect to a surface having a jointing part between a blade driving member and the base member, and wherein, when the blade driving member is pivoted in the circumferential direction of an opening, a part of the blade driving member overlaps at least one of the supporting parts for supporting the light amount adjusting blades at a position offset in a direction parallel to the center axis of the opening.

9 Claims, 5 Drawing Sheets

LIGHT AMOUNT ADJUSTING APPARATUS, LENS BARREL, AND IMAGING APPARATUS

BACKGROUND OF THE INVENTION

1. Field of the Invention

The present invention relates to a light amount adjusting apparatus and an optical apparatus. More specifically, the present invention relates to a light amount adjusting device in optical apparatus in which a lens is exchangeable or optical apparatus formed integrally with a lens.

2. Description of the Related Art

Conventionally, light amount adjusting devices used for imaging apparatuses such as video cameras, digital cameras, and the like have a structure in which two light amount adjusting blades are movably sandwiched between a base plate provided with an opening on the optical axis thereof and a cover. The two light amount adjusting blades can linear-slidably move in relatively-opposite directions in a planer perpendicular to the optical axis and can flexibly change the shape of the opening so as to adjust light amount. In the conventional light amount adjusting apparatuses, the configuration number of light amount adjusting blades is two, and thus, the shape of the aperture opening in the narrowly limited state is substantially diamond. In this case, the shape of blur/the shape of surface reflection ghost generated from a point light source looks like a diamond, which leads to a reduction in quality and is not suitable for high-grade and highly accurate imaging apparatuses. However, since the conventional light amount adjusting apparatuses have high space efficiency and are inexpensive, the conventional light amount adjusting apparatuses are often mounted to imaging apparatuses for general consumers.

In addition to the aforementioned light amount adjusting apparatus constituted by two light amount adjusting blades, there is another light amount adjusting apparatus having a structure, so-called, an iris diaphragm in which three or greater number of light amount adjusting blades are movably sandwiched between a base member provided with an opening on the optical axis thereof and a cover. The iris diaphragm is driven by a driving source via an engaging member, with which a plurality of light amount adjusting springs engages, extending from a blade driving ring which is pivoted about the optical axis. Here, examples of the driving source include a galvanometer, a stepping motor, and the like. The three or greater number of light amount adjusting blades are arranged one on top of the other on the blade driving ring in the clockwise direction or in the anticlockwise direction. The hole of one light amount adjusting blade is rotatably joined to a rotary shaft pin provided on the base member, and a drive pin provided on the blade driving ring is joined to an elongated hole section of the light amount adjusting blade. Furthermore, other light amount adjusting blades are also supported by the same structure. When the blade driving ring is rotated about, the optical axis, the plurality of light amount adjusting blades is also swung into interlock engagement with the blade driving ring, so that the light amount passing through the opening can be adjusted by changing the shape of the opening.

In the iris diaphragm device, the shape of the opening is determined by a plurality of light amount adjusting blades. Thus, the shape of the aperture opening in the narrowly limited state is a polygon and the shape of blur/the shape of surface reflection ghost generated from a point light source is close to a circle, so that the iris diaphragm device is mounted to high-grade and highly accurate imaging apparatuses. When the operating angle of the drive ring can be in a wide range, the amount of movement of each blade with respect to the rotation angle of the drive ring becomes small, high resolution control can be achieved until the aperture opening becomes small, exhibiting high sensitivity. In recent years, high-grade and highly accurate imaging apparatuses have become increasingly popular as imaging apparatuses for general consumers. In order to achieve an improvement in quality of the shape of blur/the shape of surface reflection ghost generated from a point light source, it is preferable that a light amount adjusting apparatus is constituted by a plurality of light amount adjusting blades as many as possible so as to bring the polygonal shape of the opening closer to a circle.

For example, Japanese Patent Laid-Open No. 2003-121901 discloses a light amount adjusting apparatus with a speed reduction ratio increased by the intervention of a drive gear serving as a drive transmission member fixed to the rotary shaft of a driving source in order to achieve transmission of the driving of the driving source and an intermediate gear member provided between the drive gear and the blade driving ring. Also, Japanese Patent Laid-Open No. 2007-163827 discloses a light amount adjusting apparatus in which blade rotation reference pins are provided to a blade driving member.

In order to bring the shape of the iris diaphragm closer to a circle as described above, the number of blades needs to be increased. However, a pitch in the circumferential direction of the rotation reference pins for the blades narrows with an increase in the number of blades. With this arrangement, a space for the engaging part which engages with the driving source and extends from the blade driving ring cannot be ensured. Thus, the operating angle of the drive ring becomes small, resulting in a difficulty in ensuring desired resolution. When the speed reduction ratio of the drive ring increases with the avoidance of the rotation reference pins, the space for the coupling section needs to be enlarged in the radial direction. Japanese Patent Laid-Open No. 2003-121901 also discloses a light amount adjusting device with a speed reduction ratio increased by the intervention of a stepping motor serving as a driving source, a drive gear serving as a drive transmission member fixed to the rotary shaft of the driving source in order to achieve transmission of the driving of the driving source, and an intermediate gear member provided between the drive gear and the blade driving ring. With this arrangement, the space for the coupling section and the speed reduction ratio of the drive ring can be increased. However, since the number of gear components is increased by one, the problems of backlash, rattling, or the like may occur, resulting in an adverse effect on the accuracy of the imaging apparatus.

As disclosed in Japanese Patent Laid-Open No. 2007-163827, the rotation reference pins for the light amount adjusting blades are provided on the drive ring side. With this arrangement, the rotation angle of the blade driving ring can be increased regardless of the pitch between the blade rotation reference pins. However, since the rotation reference pins for the light amount adjusting blades are formed on the blade driving ring serving as a moving body, the shape of the opening may be deformed or a shift in the center axis of the opening may occur, resulting in an adverse effect on the quality of the imaging apparatus.

SUMMARY OF THE INVENTION

The present invention provides, for example, a high-quality and high-accuracy light amount adjusting apparatus having a high speed reduction ratio.

According to an aspect of the present invention, a light amount adjusting apparatus comprising: a base member having an opening formed therein; a driving source having a rotary shaft to which a first contact part is fixed; a blade driving member that has a second contact part which is adapted to contact with the first contact part and to which a driving force from the driving source is transmitted and a plurality of first blade engaging parts formed around the circumference of the opening and is pivotally join to the base member in the circumferential direction of the opening; and a plurality of light amount adjusting blades which is arranged around the circumference of the opening and each having a second blade engaging part which is adapted to engage with the first blade engaging part, wherein the base member has a plurality of supporting parts for supporting the plurality of light amount adjusting blades which is arranged around the circumference of the opening and the second contact part is located outside a circle extending through the plurality of supporting parts, wherein the contact part between the second contact part, and the first contact part is constituted at the other surface of the base member with respect to a surface having a jointing part between the blade driving member and the base member, and wherein, when the blade driving member is pivoted in the circumferential direction of the opening, a part of the blade driving member overlaps at least one of the supporting parts for supporting the light amount adjusting blades at a position offset in a direction parallel to the center axis of the opening.

Further features of the present invention will become apparent from the following description of exemplary embodiments with reference to the attached drawings.

DESCRIPTION OF THE EMBODIMENTS

Hereinafter, preferred embodiments of the
present invention will now be described with reference to the accompanying drawings.

Figure 1:
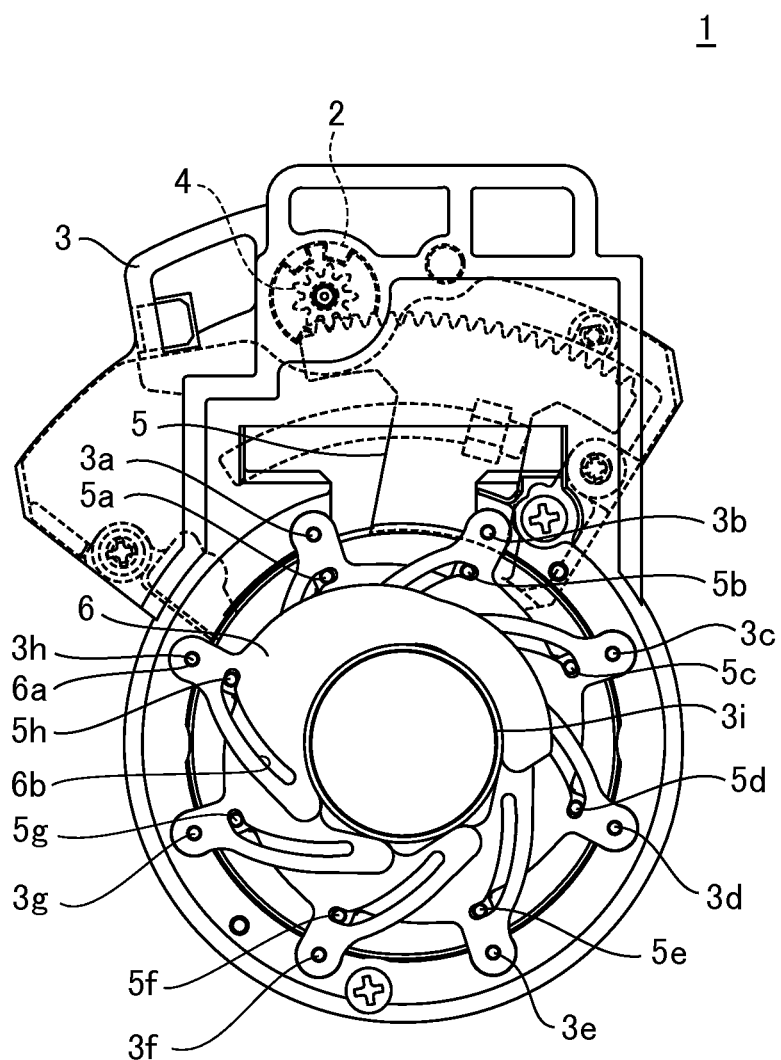
FIG. 1 is a diagram illustrating a configuration of a light amount adjusting apparatus according to one embodiment of the present invention.
Figure 2:
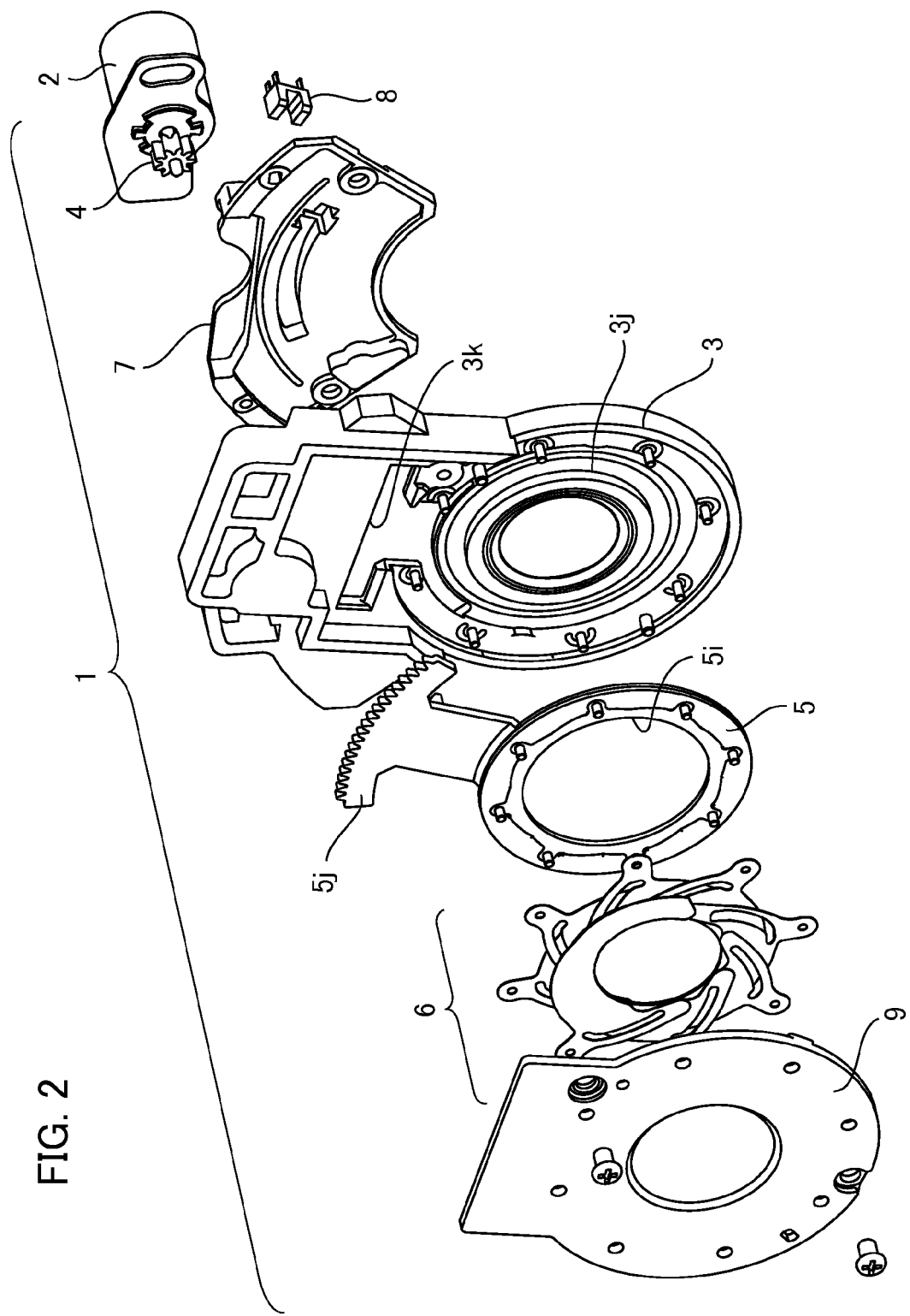
FIG. 2 is an exploded perspective view illustrating a light amount adjusting apparatus according to one embodiment of the present invention.
Figure 3:
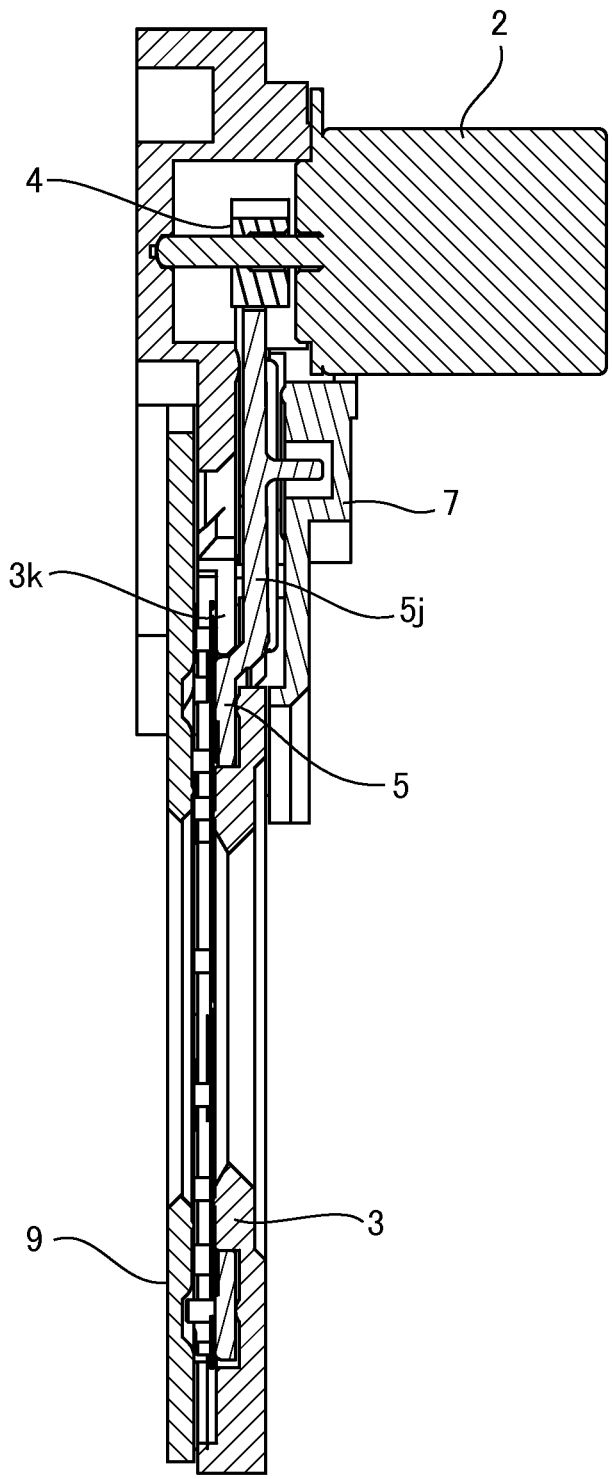
FIG. 3 is a cross-sectional view illustrating a light amount adjusting apparatus according to one embodiment of the present invention.

Firstly, a description will be given of the
light amount adjusting apparatus of the present invention with reference to FIGS. 1 to 3. FIG. 1 is a diagram illustrating a configuration of a light amount adjusting apparatus according to one embodiment of the present invention. FIG. 2 is an exploded perspective view illustrating the light amount adjusting apparatus. FIG. 3 is a cross-sectional view illustrating the light amount adjusting apparatus. Firstly, a light amount adjusting apparatus 1 includes a base member 3, a driving source 2, a drive transmission member 4 (first contact part), a blade driving member 5, and a plurality of light amount adjusting blades 6.

The base member 3 has a base member opening 3i having an opening in a circular shape, a jointing unit 3j for pivotally join to the blade driving member 5, and a hole 3k for accepting a drive transmission member engaging unit (second contact part) 5j for engaging with the drive transmission member 4. Also, supporting parts (rotation reference pins) 3a to 3h which serve as pivot reference points for the plurality of light amount adjusting blades 6 to be described below are formed on the base member 3. The driving source 2 is a driving source for driving the plurality of light amount adjusting blades 6. For example, a stepping motor, a DC motor, or the like may be employed as the driving source 2. The drive transmission member 4 is secured to the rotary shaft of the driving source 2, and transmits a driving force of the driving source 2 to the blade driving member 5.

The blade driving member 5 includes a blade driving ring 5i and a drive transmission member engaging unit 5j, which extends from the blade driving ring 5i, for engaging with the drive transmission member 4 of the driving source 2. The blade driving ring 5i engages with a light amount adjusting blade driving ring jointing unit 3j formed on the base member 3. The drive transmission member 4 engages with the drive transmission member engaging unit 5j and is pivotable by the driving force input from the driving source 2. At this time, the drive transmission member 4 pivots about the center of the base member opening 3i as the center axis of rotation. Also, the blade driving member 5 is provided with drive pins (first blade engaging parts) 5a to 5h which are formed around the circumference of the opening. In the present embodiment, the drive transmission member 4 is in a gear shape and the drive transmission member engaging unit 5j is also in an arcuate gear shape extending from the center of the base member opening 3i towards the outside, so that the drive transmission member 4 may engage with the drive transmission member engaging unit 5j in a geared manner. In the present embodiment, a method is employed such that the drive transmission member 4 engages with the drive transmission member engaging unit 5j in a geared manner. The present invention is not limited to such gear engagement. For example, another method may also be employed such that the drive transmission member 4 is a member having a pin and the drive transmission member engaging unit 5j is a member having an elongated hole so as to permit engagement, of the pin with the elongated hole.

Each of the plurality of light amount adjusting blades 6 independently has a reference hole 6a which engages with the supporting parts 3a to 3h of the base member 3 and an elongated hole (cam) (second blade engaging part) 6b which engages with the drive pins 5a to 5h of the blade driving member 5. At this time, the contact part between the elongated hole of each of the plurality of light amount adjusting blades 6 and each of the drive pins 5a to 5h of the blade driving member 5 is not limited to the aforementioned configuration. However, the present invention is applicable as long as either one of the elongated hole or the drive pin is formed in a shaft shape and the other one thereof is formed in a cam shape. The plurality of light amount adjusting blades 6 is arranged around the circumference (e.g., arranged uniformly in the circumferential direction from the center of the opening) of the opening of the base member opening 3i formed on the base member 3.

The driving force of the driving source 2 is transmitted to the blade driving member 5 via the drive transmission member 4, and thus, the plurality of light amount adjusting blades 6 is rotationally driven, resulting in a variation of the aperture diameter (opening diameter). At this time, the light amount adjusting blade 6 is rotationally driven about each of the drive pins 5a to 5h of the blade driving ring 5 engaged with the light amount adjusting blade 6b by using each of the supporting parts 3a to 3h, with which each of the plurality of light amount adjusting blades 6 engages, as a reference of rotation.

The drive transmission member engaging unit 5j perpendicularly projects from the blade driving member 5, and is joined to (the other) surface opposite to one surface of the jointing unit 3j between the base member 3 and the blade driving member 5 by passing through the hole 3k formed on the base member 3. The blade driving member 5 pivots at a position offset in the axial vertical direction (the center axis direction of the opening) with respect to at least one of the supporting parts 3a to 3h, which are formed on the base member 3, for supporting the plurality of light amount adjusting blades 6. In other words, a part of the pivot range of the blade driving member 5 overlaps in the optical axis direction with respect to at least one of the supporting parts 3a to 3h for supporting the plurality of light amount adjusting blades 6. At this time, it is preferable that the drive transmission member engaging unit 5j is located outside a circle extending through the plurality of supporting parts 3a to 3h formed on the base member 3 with respect to the jointing unit 3j between the blade driving member 5 and the base member 3. In other words, when the drive transmission member engaging unit 5j and the plurality of supporting parts 3a to 3h are projected onto a two-dimensional plane parallel to the opening plane of the opening 3i, the projected position of the drive transmission member engaging unit 5j lies outside the closed area formed by a collection of segments passing through the projected positions of the plurality of supporting parts 3a to 3h. It is preferable that the outer circumference of the blade driving ring 5i is located inside a circle extending through the plurality of supporting parts 3a to 3h formed on the base member 3. The reason for this is that production errors (tolerances) can be reduced with a decrease in the outer diameter of the blade driving ring 5i and leverage increases with an increase in ratio of the length (the width in the longitudinal direction) of the drive transmission member engaging unit 5j to the outer diameter of the blade driving ring 5i, so that the blade driving ring 5i is readily rotatable.

Furthermore, the light amount adjusting apparatus 1 includes an aperture encoder 8, a cover member 7 for preventing adhesion of dusts, foreign matter, and the like to the driving source 2 and the drive transmission member engaging unit 5j, and a blade pressing plate 9 for suppressing the movement of the plurality of light amount adjusting blades 6 in the axial vertical direction. Here, the aperture encoder 8 is an optical sensor in the present embodiment and detects the passage of a light-shielding fin (not shown) provided on the blade driving member 5.

With this configuration, the driving source 2, the blade driving member 5, and the supporting parts 3a to 3h for supporting the plurality of light amount adjusting blades 6 can be integrated with the base member 3, so that variation in accuracy can be suppressed. Furthermore, the base member 3 includes a jointing unit for determining the rotation center of the plurality of light amount adjusting blades 6 and the rotation center of the blade driving member 5 and a positioner for the driving source 2, so that variation, in accuracy can be suppressed.

Figure 4A:
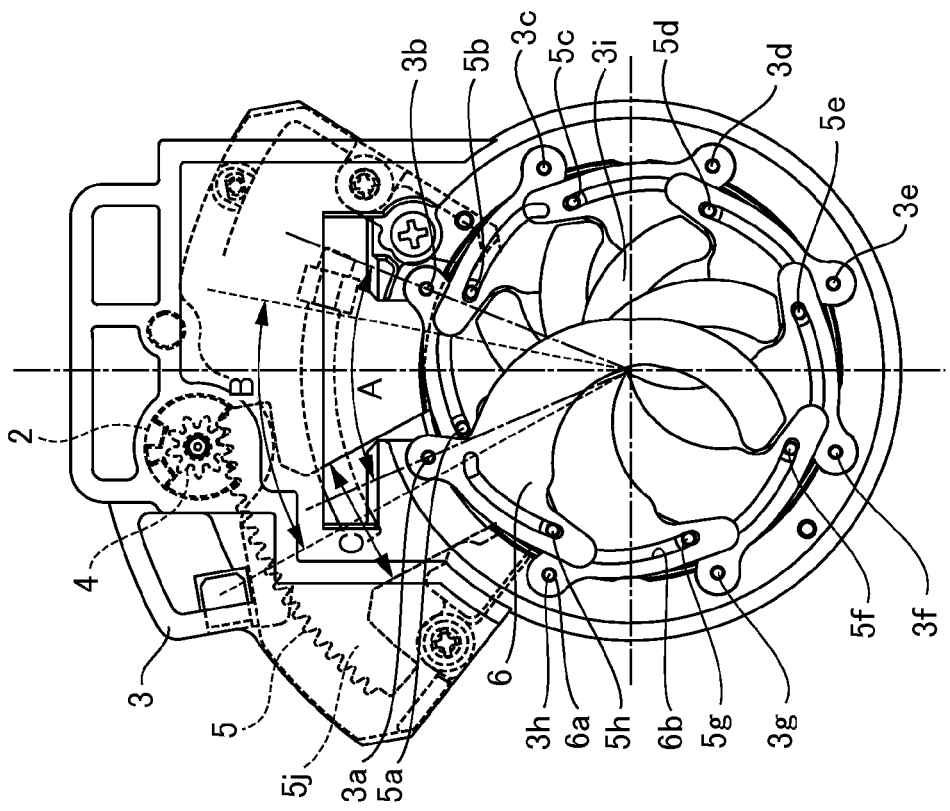
FIG. 4A is a diagram illustrating a blade driving member in the opened state of a light amount adjusting apparatus.
Figure 4B:
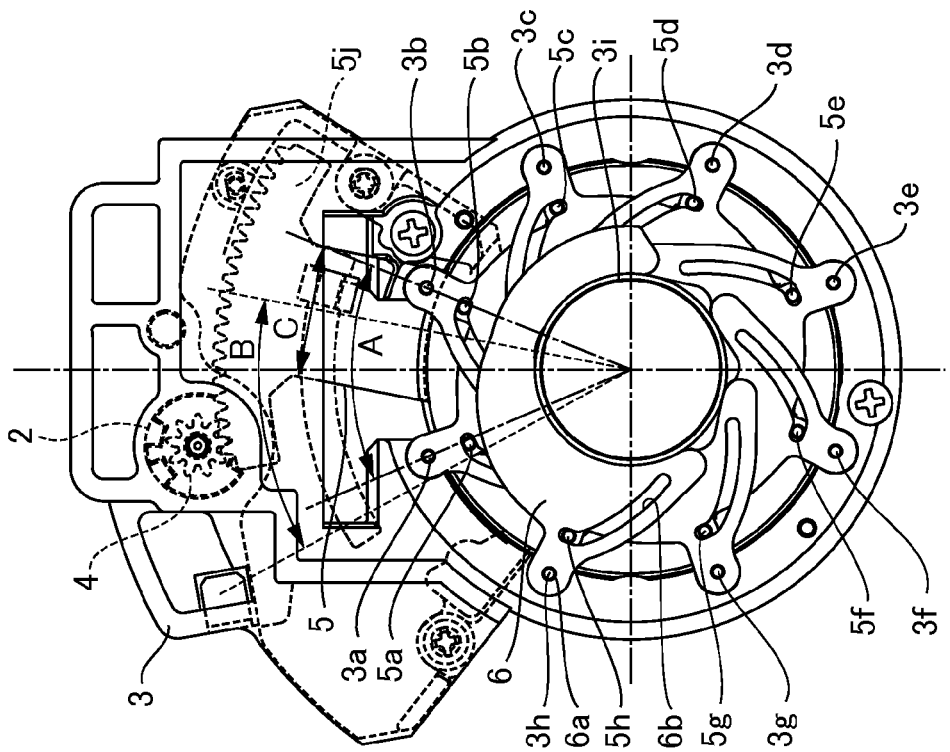
FIG. 4B is a diagram illustrating a blade driving member in the narrowly-limited state of a light amount adjusting apparatus.

Next, a description will be given of the operation range of the blade driving member 5 of the light amount adjusting apparatus 1 of the present invention with reference to FIGS. 4A and 4B. FIG. 4A is a diagram illustrating the blade driving member 5 in the opened state of the light amount adjusting apparatus 1. FIG. 4B is a diagram illustrating the blade driving member 5 in the narrowly-limited state of the light amount adjusting apparatus 1. Here, the supporting parts 3a to 3h formed on the base member 3 as references of rotation of the plurality of light amount adjusting blades 6 are uniformly arranged in the circumferential direction about the optical axis, and the angle between two adjacent ones of the supporting parts 3a to 3h for supporting the plurality of light amount adjusting blades 6 is defined as "angle A". A range of pivoting the blade driving member 5 about the optical axis is defined as "angle B" and the width of the engaging unit 5j vertically extending for permitting engagement of the blade driving member 5 with the drive transmission member 4 of the driving source 2 is defined as "C". Here, in the configuration of the present embodiment, the blade driving member 5 can be operated in a range from the angle A between two adjacent ones of the supporting parts 3a to 3h to the sum of the rotating angle B of the blade driving ring 5i and the width C of the drive transmission member engaging unit 5j. In other words, the operation range of the blade driving ring 5i is in a relationship of $A \leq B+C$.

Figure 5:
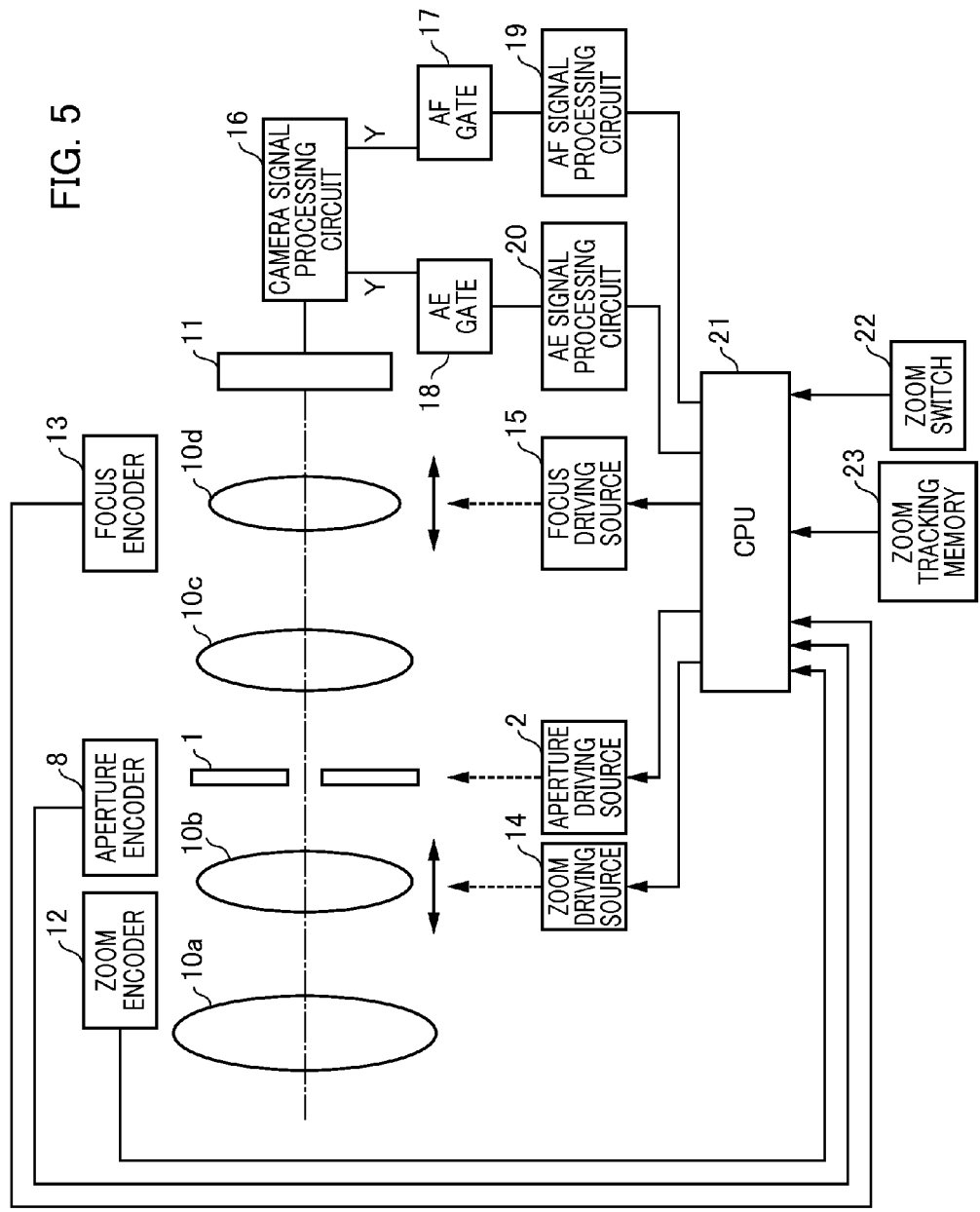
FIG. 5 is a block diagram illustrating a configuration of an optical apparatus to which a light amount adjusting apparatus is applied.

Next, a description will be given of an imaging apparatus including a configuration of a lens barrel to which the present invention is applied. FIG. 5 is a block diagram illustrating a configuration of an imaging apparatus. Firstly, the lens barrel has so-called a tiered-type barrel structure, and includes a first lens holding frame 10a, a second lens holding frame 10b, a third lens holding frame 10c, a fourth lens holding frame 10d in order from an object side to an image plane side.

The first lens holding frame 10a and the third lens holding frame 10c hold a fixed lens group. The second lens holding frame 10b and the fourth lens holding frame 10d hold a movable lens group by two guide shafts such that the movable lens group can be advanced or retracted in the axial vertical direction. A rear barrel for holding a CCD is provided at the end on the image plane side. The second lens holding frame 10b and the fourth lens holding frame 10d are enclosed between the first lens holding frame 10a and the rear barrel. The lens barrel is constituted by the first lens holding frame 10a, the third lens holding frame 10c, and the rear barrel or is constituted by the first lens holding frame 10a and the rear barrel in a substantially sealed manner.

The imaging apparatus includes the aforementioned lens barrel, an aperture driving source 2, a solid imaging element 11, a zoom driving source 14, and a focus driving source 15. Furthermore, the imaging apparatus includes a zoom encoder 12, an aperture encoder 8, a focus encoder 13, a camera signal processing circuit 16, and a CPU 21.

The aperture driving source 2 is the driving source of the light amount adjusting apparatus 1 of the present invention. The solid imaging element 11 is, for example, an element such as a CCD or the like. The zoom driving source 14 is the driving source of the second lens holding frame 10b and includes a zoom actuator (not shown) or the like. The focus driving source 15 is the driving source of the fourth lens holding frame 10d and includes a focus actuator (not shown). The zoom actuator (not shown) and the focus actuator (not shown) may be, for example, a stepping motor, a DC motor, or the like.

The zoom encoder 12 detects the absolute position of the second lens holding frame 10b in the axial vertical direction, and the focus encoder 13 defects the absolute position of the fourth lens holding frame 10d in the axial vertical direction. For example, when stepping motors are used for the zoom actuator (not shown) and the focus actuator (not shown), it is general to locate the holding frame at a reference position of each of the zoom actuator and the focus actuator on the optical axis and successively count the number of operation pulses to be input to the stepping motors to thereby perform position detection. For example, when DC motors are used for the zoom actuator (not shown) and the focus actuator (not shown), position detection is performed by using an absolute position encoder such as a volume or a magnetic encoder.

The aperture encoder 8 is, in general, the one which incorporates a magnetic sensor in the aperture driving source 2 and detects the relationship in rotational position between the rotor and the stator to thereby perform position detection. When a stepping motor is used for the aperture driving source 2, the number of operation pulses to be input to the stepping motor may be successively counted by using the optical sensor so as to perform position detection.

The camera signal processing circuit 16 performs predetermined amplification and gamma correction for an output signal (a contrast signal of a video signal) from the solid imaging element 11 (e.g., CCD). A contrast signal of a video signal processed by the camera signal processing circuit 16 passes through an AE gate 18 and an AF gate 17. In other words, an optimal signal extraction range for determining the exposure and adjusting the focus is set by these gates from among the entire screen. The gate size may be variable and in some cases a plurality of gates may be provided, but a detailed description thereof will be omitted for descriptive convenience.

An output signal passed through the AF gate 17 and the AE gate 18 is input to an AF signal processing circuit 19 and an AE signal processing circuit 20. The AF signal processing circuit 19 is a signal processing circuit for AF (Auto Focus) that generates one or a plurality of output signals concerning the high-frequency component of a video signal. The AE signal processing circuit 20 is a signal processing circuit, for automatic exposure (AE). A zoom switch 22 is a switch to be operated by a user (photographer). A zoom tracking memory 23 stores information about the position of the fourth lens holding frame 10d to be set depending on the object distance and the position of the second lens holding frame 10b in changing the magnification. The zoom trucking memory may be a memory in the CPU 21. The CPU 21 controls the aperture driving source 2, the zoom driving source 14, and the focus driving source 15 by using the input signal.

Next, a description will be given of the operation of optical apparatus. When the user operates the zoom switch 22, the CPU 21 calculates a desired positional relationship between the second lens holding frame 10b and the fourth lens holding frame 10d based on information in the zoom tracking memory 23. The CPU 21 drives and controls the zoom driving source 14 and the focus driving source 15 so as to maintain the calculated desired positional relationship. At this time, it is preferable that the absolute value of the second lens holding frame 10b in the axial vertical direction as the detection result of the zoom encoder 12 coincides with the desired position of the second lens holding frame 10b calculated by the CPU 21. It is also preferable that the absolute value of the fourth lens holding frame 10d in the axial vertical direction as the detection result of the focus encoder 13 coincides with the desired position of the fourth lens holding frame 10d calculated by the CPU 21. In addition, in AF operation, the CPU 21 drives and controls the focus driving source 15 such that an output from the AF signal processing circuit 19 exhibits a peak. Furthermore, in order to obtain correct exposure, the CPU 21 controls the driving of the aperture driving source 2 and controls the opening diameter of the light amount adjusting apparatus 1 based on an output from the aperture encoder 8 such that the average value of outputs of Y signals having passed through the AE gate 18 is set to a predetermined position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-016124 filed on Jan. 30, 2013, which is hereby incorporated by reference herein in its entirety.

What is claimed is:

1. A light amount adjusting apparatus comprising:
   a base member having an opening formed therein;
   a blade driving member that has a first contact part configured to transmit a driving force and a plurality of first blade engaging parts formed around the circumference of the opening, the blade driving member pivotally engaging relative to the base member in the circumferential direction of the opening; and
   a plurality of light amount adjusting blades arranged around the circumference of the opening and each having a second blade engaging part configured to engage with one of the plurality of first blade engaging parts at a first side of the base member,
   wherein the base member has a plurality of supporting parts supporting the plurality of light amount adjusting blades at the first side and arranged around the circumference of the opening,
   wherein the first contact part is disposed outside a circle extending through the plurality of supporting parts and at a second side of the base member opposite the first side.

2. The light amount adjusting apparatus according to claim 1, wherein the blade driving member has a blade driving ring in which the plurality of first blade engaging parts are disposed and the outer circumference of the blade driving ring is located inside the circle extending through the plurality of supporting parts.

3. The light amount adjusting apparatus according to claim 1, wherein one of the first blade engaging part or the second blade engaging part is formed in a shaft shape and the other thereof is formed in a cam shape.

4. The light amount adjusting apparatus according to claim 1, wherein the base member further comprises:
   a driving source configured to generate the driving force;
   a jointing part configured to determine the rotation center of the plurality of light amount adjusting blades and the rotation center of the blade driving member; and
   a positioner for the driving source.

5. The light amount adjusting apparatus according to claim 1, wherein the base member further comprises:
   a driving source having a rotary shaft and a second contact part fixed to the rotary shaft;
   wherein the first contact part and the second contact part are formed in a gear shape, with the second contact part having teeth extending radially outwardly from the center of the rotary shaft, and the first contact part has arcuate teeth extending radially outwardly from the center of the opening.

6. A lens barrel comprising:
   a lens; and
   a light amount adjusting apparatus comprising:
   a base member having an opening formed therein;
   a blade driving member that has a first contact part configured to transmit a driving force and a plurality of first blade engaging parts formed around the circumference of the opening, the blade driving member pivotally engaging relative to the base member in the circumferential direction of the opening; and a plurality of light amount adjusting blades arranged around the circumference of the opening and each having a second blade engaging part configured to engage with one of the plurality of first blade engaging parts at a first side of the base member, wherein the base member has a plurality of supporting parts supporting the plurality of light amount adjusting blades at the first side and arranged around the circumference of the opening, wherein the first contact part is disposed outside a circle extending through the plurality of supporting parts and at a second side of the base member opposite to the first side.

7. An imaging apparatus comprising:

an imaging element; and a lens barrel having a lens and a light amount adjusting apparatus, wherein the light amount adjusting apparatus comprises:

a base member having an opening formed therein;

a blade driving member that has a first contact part configured to transmit a driving force and a plurality of first blade engaging parts formed around the circumference of the opening, the blade driving member pivotally engaging relative to the base member in the circumferential direction of the opening; and a plurality of light amount adjusting blades arranged around the circumference of the opening and each having a second blade engaging part configured to engage with one of the plurality of first blade engaging parts at a first side of the base member, wherein the base member has a plurality of supporting parts supporting the plurality of light amount adjusting blades at the first side and arranged around the circumference of the opening, wherein the first contact part is disposed outside a circle extending through the plurality of supporting parts and at a second side of the base member opposite to the first side.

8. The light amount adjusting apparatus according to claim 1, wherein, when the blade driving member is pivoted in the circumferential direction of the opening, the first contact part overlaps at least one of the supporting parts supporting the light amount adjusting blades in a direction of the center axis of the opening.

9. The light amount adjusting apparatus according to claim 1, wherein, when the blade driving member is pivoted in the circumferential direction of the opening, the first contact part overlaps at least one of the supporting parts supporting the light amount adjusting blades at a position disposed in a direction vertical at right angles to the opening.

* * * * *